United States Patent

[11] 3,617,355

| [72] | Inventors | Wilhelm Loffler<br>Kelkheim, Taunus;<br>Martin Rieber, Schonberg, Taunus, both of Germany |
|---|---|---|
| [21] | Appl. No. | 889,351 |
| [22] | Filed | Dec. 30, 1969 |
| [45] | Patented | Nov. 2, 1971 |
| [73] | Assignee | Farbwerke Hoechst Aktiengesellschaft vormals Meister Lucius & Bruning Frankfurt Main, Germany |
| [32] | Priority | Jan. 3, 1969 |
| [33] | | Germany |
| [31] | | P 19 00 234.7 |

[54] METHOD OF APPLYING WATER AND OIL REPELLENT FINISH FOR SYNTHETIC FIBROUS MATERIALS
8 Claims, No Drawings

[52] U.S. Cl. .................................................. 117/93.31, 117/135.5, 117/138.8, 117/161 UZ/, 117/161 UE, 8/115.5, 8/115.6, 8/115.7, 8/DIG. 18, 204/159.23

[51] Int. Cl. ..................................................... B44d 1/50
[50] Field of Search ........................................ 117/93.31, 135.5, 138.8, 161 UZ, 161 UE; 8/115.5, 115.6, 115.7, DIG. 18; 204/159.23

[56] References Cited
UNITED STATES PATENTS

| 3,382,222 | 5/1968 | Pittman et al. | 117/161 UE |
| 3,465,045 | 9/1969 | Pittman et al. | 117/135.5 X |

*Primary Examiner*—Alfred L. Leavitt
*Assistant Examiner*—J. H. Newsome
*Attorney*—Connolly and Hutz ABSTRACT: Process for rendering foils and fibrous materials water and oil repellent by grafting onto these substrates a perfluoro n-alkyl-vinyl ether under simultaneous use of trifluoroacetic acid and/or methylene chloride under the action of a grafting initiator.

METHOD OF APPLYING WATER AND OIL REPELLENT FINISH FOR SYNTHETIC FIBROUS MATERIALS

Methods for providing textile materials and other fibrous materials with a water and oil repellent finish are already known. For such purpose, paraffins, organic polysiloxanes and polyfluoro-alkyl compounds are mostly used. The best effects are obtained, in general, with polyfluoro-alkyl compounds. Perfluoro-carboxylic acids and unsaturated polyfluoro-alkyl compounds, mostly in polymerized form, are used in most cases. Thus, in U.S. Pat. No. 2,803,615 polymeric compounds have been proposed which are prepared from acrylic esters or methacrylic esters of perfluoro-alkane-sulfamido-alkanols.

However, the finishes prepared with polyfluoro-alkyl compounds according to the known processes are not sufficiently stable to mechanical wear, dry cleaning and washing. Thus, it is endeavoured to improve the stability of such water and oil repellent finishes of textile materials.

Now, we have found that excellent water and oil repellent finishes are obtained on synthetic fibrous materials and foils by grafting onto the substrate perfluoro n-alkyl-vinyl ethers in the presence of tri-fluoro-acetic acid and/or methylene chloride and under the action of an ionizing irradiation and/or with the aid of radical forming catalysts. The finishes obtained according to the invention have the substantial advantage of being extraordinarily stable to mechanical wear and to cleansing operations.

As perfluoro n-alkyl-vinyl ether compounds, there are used according to the invention compounds of the general formula $F_3C-(CF_2)_x-O-CH=CH_2$, in which $x$ stands for an integer from 0 to 17, preferably 2 to 8.

It was found that the course of the grafting reaction is considerably influenced by auxiliary agents or solvents present during the grafting reaction. In this regard it was found unexpectedly that the grafting reaction is influenced in a particularly favorable manner by the use of trifluoroacetic acid and/or methylene chloride as auxiliary agent.

In the process of the invention, the mixing ratio of the monomers of the above-specified formula, on the one hand, to the auxiliary agents trifluoroacetic acid and/or methylene chloride, on the other hand, can vary within wide limits. It is suitable to use a mixing ratio of about 1:30 to about 15:1, preferably 1:5 to 5:1, parts by weight. If a dilution of the monomers for the application is desired or required, also other suitable solvents that are inert towards the perfluoro n-alkyl-vinyl ethers and the substrate may be added to the mixture of the invention. As such solvents, there may be used, for example chloroform, trichloro-ethylene, perchloro-ethylene, tetrachloro-ethane, polyfluorinated saturated aliphatic or cycloaliphatic or also aromatic hydrocarbons such as trifluoro-dichloro-ethane, hexafluoro-dichloro-cyclopentene and trifluoro-methyl-benzene. The quantity of solvents of this type used, however, must now exceed the eight-fold, preferably the four-fold quantity of the auxiliary agents trifluoroacetic acid and/or methylene chloride.

In order to secure a sufficient water and oil repellent effect of the finish, the monomers of the above-specified general formula are to be applied onto the substrate to be finished in quantities of at least 0.1% by weight, referred to the weight of the substrate. In general, quantities in the range of from about 0.5 to 10% by weight, referred to the weight of the goods, will be applied, depending on the desired effect and on the goods to be finished. In special cases, however, the quantities applied may be lower or higher than the above-mentioned limits; thus, for example, there may also be applied quantities of up to about 25% by weight.

The monomers to be used according to the invention are mixed thoroughly with the auxiliary agents trifluoroacetic acid and/or methylene chloride, prior to their application onto the goods to be finished. As already stated, other suitable inert solvents may be added in order to further dilute the mixture to be applied. Furthermore, it is also possible to apply the mixture of the said monomers and the mentioned auxiliary agents and, if desired or required, solvents, in the form of an aqueous emulsion onto the goods. For preparing such aqueous emulsions, there may be used, if necessary, suitable emulsifiers, for example the sodium salt of perfluoro-octanoic acid or addition compounds of ethylene oxide with alkyl-phenols fat alcohols or fatty acids.

The mixture consisting of the monomers and auxiliary agents or of their solution or emulsion may be applied in any desired manner onto the synthetic fibrous materials or any foils, for example by immersion, padding, spraying or similar processes. In addition, there is the possibility of applying the monomers in the gaseous state onto the goods which have already been wetted with the auxiliary agents and then to carry out the grafting reaction.

For bringing about the grafting reaction, the action of an ionizing irradiation and/or the presence of radical-forming catalysts is necessary. As ionizing irradiation, gamma rays or electron rays having an energy of at least 50 electron-Volts (ev.), preferably of up to about 50,000 ev. or more may be used. The dose rate of ionizing irradiation to be applied is not critical. In general, dose rates in the range of from about 0.1 to 15 Mrad, especially from 0.5 to 4 Mrad, are preferred.

As radical forming catalysts, ozone and peroxy compounds such as di-benzoyl-peroxide, di-tert.butyl-peroxide, acetyl peroxide, peracids such as peracetic acid, persulfates, perborates, perbenzoates and hydrogen peroxide and esters of peracids such as di-isopropyl-percarbonate, as well as azo compounds such as azo di-isobutyronitrile may be used.

The ionizing irradiation is applied onto the substrate to be finished before, during or after the application of the mixture according to the invention. If the ionizing irradiation is applied during or after application of the mixture, this operation is preferably carried out in the absence of oxygen.

For accelerating the grafting reaction, it is suitable to subject the goods treated with the mixture according to the invention to a thermal treatment. Therefor, temperatures in the range of from about 30 to about 140° C., preferably 35° to 80° C., may be used. The duration of the thermal treatment may be about 1 minute to about 2 hours, depending on the temperature used. If an ionizing irradiation is applied after application of the mixture, the thermal treatment may be carried out before, during or after the irradiation. If the irradiation has a sufficient intensity, the thermal treatment may also be omitted.

If ozone is used as the grafting initiator, the substrates may be pretreated, before application of the mixture of monomers and auxiliaries of the invention, with gaseous ozone, if desired in admixture with other inert gases or with a solution of ozone in water or in another inert solvent. When ozone solutions or solid or liquid grafting initiators are used, these are added suitably to the mixture of auxiliary agents and the monomers or to the solution or emulsion of the mixture prior to its application.

The application of the finish may be effected in continuous or discontinuous manner, For example, in a preferred method, the mixture of the monomers and auxiliary agents or a solution or emulsion of this mixture is applied onto the goods to be provided with the finish and the goods are then subjected to the action of an ionizing irradiation, as far as possible under exclusion of oxygen. The goods treated are then suitably heated to a temperature in the range of from 30° to 140° C. The thermal treatment may also be carried out prior to the irradiation treatment.

In another advantageous method of operation, the substrate is first exposed to irradiation by ionizing rays in the absence of oxygen and then the mixture of the monomers and auxiliary agents, if desired in the form of a solution or emulsion, is applied onto the substrate and thereafter, the thermal treatment is carried out, preferably under emulsion of oxygen. The process the process of the present invention yields outstanding water and oil repellent finishes which are stable to many washings and dry cleaning processes. To a certain limited extent the finishes are also stable to high temperature dyeing. Accordingly, the process of the invention, which yields water and oil repellent finishes that can be considered as really permanent, has thus a substantial technical advantage over the known finishing processes.

The process of the invention may be applied to fibrous materials and foils of synthetic high polymers as well as to fibrous materials consisting of mixtures of natural fibers and synthetic fibers. As synthetic high polymers from which the fibers and foils may consist there may be mentioned, for example linear polyesters, for example those of the type of polyethylene terephthalate, polyamides, polyolefins such as polyethylene and polypropylene polyvinyl chloride and polycrylonitrile. The process of the invention is particularly suitable for rendering water and oil repellent fibrous material which consist of, or contain, linear polyesters. As fibrous material, there may be mentioned textile or industrial fabrics, knit fabrics or fiber fleeces. The process of the invention may also be applied to synthetic filaments, threads or yarns before these are further processed. In these cases it is possible to omit a special finishing operation of the processed textile material.

The textile materials finished according to the present invention are particularly suitable, for example for the manufacture of rain-proof clothing. Since the textile character of the finished goods is maintained, they may likewise be used for the manufacture of all kinds of normal clothings. Furthermore, the fibrous materials finished according to the invention may also be used in the manufacture of, for example, tent clothes, umbrella clothes and any other kinds of industrial products.

The advantageous water and oil repellent effects of the finishes produced according to the invention are shown in the following examples by the indicated test results. In these tests the values for the "water absorption," "water throughput" and "water-repellent effect" were determined according to the sprinkling test method by Dr. Bundesmann (cf. K. Lindner, Tenside—Textilhilfsmittel—Waschrohstoffe, Volume 2, 2nd Edition (1964), page 1880). In this test method the specimen to be tested are subjected to a constant artificial sprinkling. The "water absorption" is the percentual weight increase of the centrifuged fabric specimen. The "water throughput" is the total volume of water, measured in cc., that has run through the samples of fabric during the sprinkling. The "water-repellent effect" is evaluated visually on the fact how the artificial rain is repelled by the specimen, the number 5 representing a very good repellent effect and the number 1 representing a poor repellent effect.

The oil-repellent properties of the specimen finished were evaluated with the aid of the 3 M-test (cf. Textile Research Journal, Vol. 32 (1962), pages 320 to 331). In this test, the resistance of a fabric to wetting by oils is measured. Paraffin oil and mixtures of paraffin oil with n-heptane are used as test oils. The mixture of n-heptane to the paraffin oil increases the wetting effect of the oil mixture. The test mixtures are applied in form of a drop onto the fabric to be tested. The resistance to wetting of the fabric to be tested is the higher the larger the proportion of n-heptane in the oil mixture which just still does not yet wet.

The mixtures of paraffin oil with n-heptane correspond to the following resistances to wetting which have been established for the 3 M-test:

| Paraffin oil % | n-Heptane % | Resistance to wetting |
|---|---|---|
| 100 | 0 | 50 |
| 90 | 10 | 60 |
| 80 | 20 | 70 |
| 70 | 30 | 80 |

The the following examples illustrate the invention The percentage values used in the examples are percent by weight.

EXAMPLE 1

25 g. of a polyethylene terephthalate taffeta having a weight of about 55 g. per m$^2$ were wetted with a mixture of 8 g. of heptafluoropropyl-vinyl ether and 2 g. of trifluoroacetic acid and then irradiated in a closed vessel, under exclusion of oxygen, with a dose of 4 Mrad of gamma rays (Co 60). The dose rate was 2.1 ×10$^5$ rad per hour. The specimen was then heated for 1 minute to 140° C. in a drying cabinet. The weight increase was about 15%.

The fabric so treated showed an excellent water-repellent effect. The sprinkling test according to Dr. Bundesmann gave the following values:

Water absorption: about 1 to 2%
Water-repellent effect: 5 (very good).

The test for the oil-repellent effect by the 3 M-test gave a wetting resistance of 70.

EXAMPLE 2

15 of a fabric of polyethylene terephthalate as that described in example 1 were wetted with a mixture of 6.5 g. of n-heptofluoropropyl-vinyl ether and 2 g. of trifluoracetic acid and irradiated with a dose of 12 Mrad of electron rays (3 MeV electron accelerator). The specimen was then heated for 1 hour. at 80° C. in a drying cabinet. The weight increase was about 12% %. The water-repellent effect corresponded to the result obtained in example 1.

EXAMPLE 3

25 g. of a polyethylene terephthalate fabric as that described in example 1 were wetted with a mixture of 10 g. of n-heptafluoropropyl-vinyl ether and 3.5 g. of trifluoroacetic acid and irradiated with 4 Mrad of gamma rays (Co 60) under exclusion of the oxygen of the air. The specimen was then heated for 1 minute to 120° C. The weight increase was about 15 percent.

The test of the finish obtained, which was effected after having subjected the specimen 5 times to dry cleaning with perchloro-ethylene, still showed a good water-repellent effect, the value of the water-absorption was unchanged within the error limit and the oil-repellent effect had not changed. The test results are shown in the following table under (a).

Another specimen of 25 g. of the same fabric was wetted, for comparison, without simultaneous use of trifluoroacetic acid, solely with 10 g. of n-heptafluoropropyl-vinyl ether and then further treated as described above. The values (b) determined in a test of the fabric thus treated were distinctly poorer than the values obtained with the finishes produced with simultaneous use of trifluoroacetic acid. The superiority of the finish of the invention was more evident when subjecting the specimen to a test evident in a test of the specimen after having subjected them 5 times to dry cleaning.

| Test | Untreated | Finished (a) | (b) | (a)[1] | (b) |
|---|---|---|---|---|---|
| Water absorption (percent) | 10.0 | 1.0 | 2.0 | 0.8 | 5.5 |
| Water throughput (ml.) | 425 | 143 | 220 | 212 | 330 |
| Water-repellent effect | 1 | 4-5 | 3 | 3 | 2 |
| 3 M-Test | ([2]) | 80 | 70 | 70-80 | 50 |

[1] After 5 dry cleaning operations.
[2] Below 50.

EXAMPLE 4

25 g. of a polyethylene terephthalate fabric as that described in example 1 were wetted with a mixture of 10 g. of n-heptafluoropropyl-vinyl ether and 3.5 g. of methylene chloride and irradiated with 4 Mrad of gamma rays (Co 60) under exclusion of the oxygen of the air. The weight increase amounted to about 10%. The specimen was then heated for 1 minute to 140° C. The test results show that the water and oil repellent effects were very stable.

| Test | untreated | Finished | finished: after 5 dry cleaning operations |
|---|---|---|---|

| | | | |
|---|---|---|---|
| Water absorption (%) | 10.0 | 6.5 | 0.5 |
| Water throughput (ml.) | 425 | 214 | 225 |
| Water repellent effect | 1 | 3 | 3 |
| 3 M-test | below 50 | 70 | 70 |

EXAMPLE 5

25 g. of a polycaprolactam taffeta were wetted with a mixture of 4 g. of methylene chloride and 6.5 g. of nonafluorobutyl-vinyl ether and irradiated at room temperature with a dose of 2 Mrad of electron rays under exclusion of oxygen. The goods so treated were then heated for 5 minutes to 100° C. The weight increase was about 6%. The water and oil repellent effects were good to very good.

EXAMPLE 6

25 g. of a polyethylene terephthalate taffeta as that described in example 1 were exposed for 2 hours at room temperature to an atmosphere containing about 3.5% by volume of ozone and about 96.5 percent of oxygen. The ozone absorbed on the surface was removed by a treatment for about 2 minutes with an aqueous solution of sodium bisulfite having a strength of about 2%. The fabric was rinsed with cold distilled water and dried at 60° C. and then wetted with a mixture of 2.5 g. of trifluoroacetic acid, 3.5 g. of methylene chloride and 10 g. of n-heptadecafluorooctyl-vinyl ether and finally heated for 6 hours to 60 ° C. The specimen was subsequently treated for 1 hour with boiling trichloro-ethylene under reflux. The water and oil repellent effects were good.

EXAMPLE 7

10 g. of a polycaprolactam fabric were shaken with an emulsion consisting of 100 g. of water, 1 g. of sodium salt of perfluoro-octanoic acid, 2 g. of trifluoroacetic acid and 0.5 g. of peracetic acid and 10 g. of n-heptafluoropropyl-vinyl ether in a pressure vessel for 8 hours while heating to 55° C. The specimen was then treated for 1 hour with boiling methanol under reflux and dried. The weight increase was about 2%.

The fabric so treated showed good water and oil repellent effects.

We claim:

1. Process of providing foils and fibrous materials which consist of, or contain, synthetic high polymers with a water and oil repellent finish, which comprises grafting a perfluoro n-alkyl-vinyl ether of the general formula $$F_3C-(CF_2)_x-O-CH=CH_2$$

in which x represents an integer from 0 to 17, onto the substrate under simultaneous use of trifluoroacetic acid and/or methylene chloride and under the action of ionizing irradiation and/or with the aid of radical-forming catalysts.

2. A process as claimed in claim 1, wherein as perfluoro n-alkyl-vinyl ether a compound of the general formula $$F_3C-(CF_2)_x-O-CH=CH_2$$

in which x represents an integer from 2 to 8 is used.

3. A process as claimed in claim 1, wherein the perfluoro n-alkyl-vinyl ether and the auxiliary agents trifluoroacetic acid and/or methylene chloride are used in a ratio of 1:30 to 15:1 parts by weight.

4. A process as claimed in claim 1, wherein the perfluoro n-alkyl-vinyl ether and the auxiliary agents trifluoroacetic acid and/or methylene chloride are applied onto the goods to be provided with the finish in the form of a solution in an organic solvent or of an aqueous emulsion.

5. A process as claimed in claim 1, wherein the perfluoro n-alkyl-vinyl ether is applied in quantities of about 0.5 to 10%, referred to the weight of the goods to be provided with the finish.

6. A process as claimed in claim 1, wherein the goods treated with the perfluoro n-alkyl-vinyl ether and the auxiliary agents trifluoroacetic acid and/or methylene chloride are heated to about 30 to 140°C.

7. A process as claimed in claim 1, wherein the action of the ionizing rays on the goods to be provided with the finish is carried through either before, during or after application of the perfluoro n-alkyl-vinyl ether and of the auxiliary agents trifluoroacetic acid and/or methylene chloride.

8. A process as claimed in claim 1, wherein ozone is applied as grafting initiator either before or during application of the perfluoro n-alkyl-vinyl ether and of the auxiliary agents trifluoroacetic acid and/or methylene chloride onto the goods ether and of be provided with a finish.